United States Patent [19]
Galloway et al.

[11] Patent Number: 5,606,592
[45] Date of Patent: Feb. 25, 1997

[54] METHOD AND APPARATUS FOR ANALYZING RESISTIVE FAULTS ON TELEPHONES CABLES

[75] Inventors: George G. Galloway, Mineral Wells; Paul R. Siglinger, Weatherford, both of Tex.

[73] Assignee: Industrial Technology, Inc., Mineral Wells, Tex.

[21] Appl. No.: 432,667

[22] Filed: May 2, 1995

Related U.S. Application Data

[63] Continuation of Ser. No. 78,593, Jun. 16, 1993.

[51] Int. Cl.$^6$ .............................. H04M 1/24; H04M 3/08; H04M 3/22

[52] U.S. Cl. ...................... 379/30; 379/5; 379/6; 379/24; 379/26; 379/27

[58] Field of Search ...................... 379/5, 21, 22, 379/24, 26, 27, 30, 1, 6, 20, 34; 324/52, 60, 509, 512, 522, 523, 527, 519, 111, 429, 433, 616, 713

[56] References Cited

U.S. PATENT DOCUMENTS

| | | | |
|---|---|---|---|
| Re. 30,692 | 7/1981 | Ellson | 379/24 |
| 3,891,895 | 6/1975 | Wittlinger | 324/509 |
| 4,022,990 | 5/1977 | Bauer | 379/24 |
| 4,028,507 | 6/1977 | Hoppough | 379/27 |
| 4,032,841 | 6/1977 | Knippelmier | 324/519 |
| 4,144,487 | 3/1979 | Pharney | 379/26 |
| 4,320,338 | 3/1982 | Morris | 379/24 |
| 4,396,809 | 8/1983 | Brunssen | 379/207 |
| 4,399,402 | 8/1983 | Pelletier | 379/26 |
| 4,514,694 | 4/1985 | Finger | 324/429 |
| 4,820,991 | 4/1989 | Clark | 379/26 |
| 4,845,737 | 7/1989 | Ohlendorf | 379/30 |
| 4,868,507 | 9/1989 | Reed | 379/26 |
| 4,882,742 | 11/1989 | Kaiser | 379/30 |
| 4,947,469 | 8/1990 | Vokey et al. | 324/523 |
| 5,029,274 | 7/1991 | Goff et al. | 379/26 |
| 5,083,086 | 1/1992 | Steiner | 379/26 |
| 5,144,252 | 9/1992 | Walsworth et al. | 379/26 |
| 5,222,119 | 6/1993 | Asano | 379/26 |
| 5,444,759 | 8/1995 | Vogt | 379/30 |

Primary Examiner—Curtis Kuntz
Assistant Examiner—Vijay Shankar
Attorney, Agent, or Firm—Geoffrey A. Mantooth

[57] ABSTRACT

Resistive faults are analyzed on a conductor in a telephone line by first charging the conductor to an initial voltage. The conductor is allowed to float for a finite amount of time, allowing some of the charge on the conductor to leak through any resistive fault. Then, the voltage of the conductor is measured and compared to the initial voltage. Loss of voltage indicates a resistive fault. This information can be used to provide an indication of the accuracy of a capacitance measurement and can be used to correct the capacitance measurement to account for the error due to the resistive fault.

6 Claims, 2 Drawing Sheets

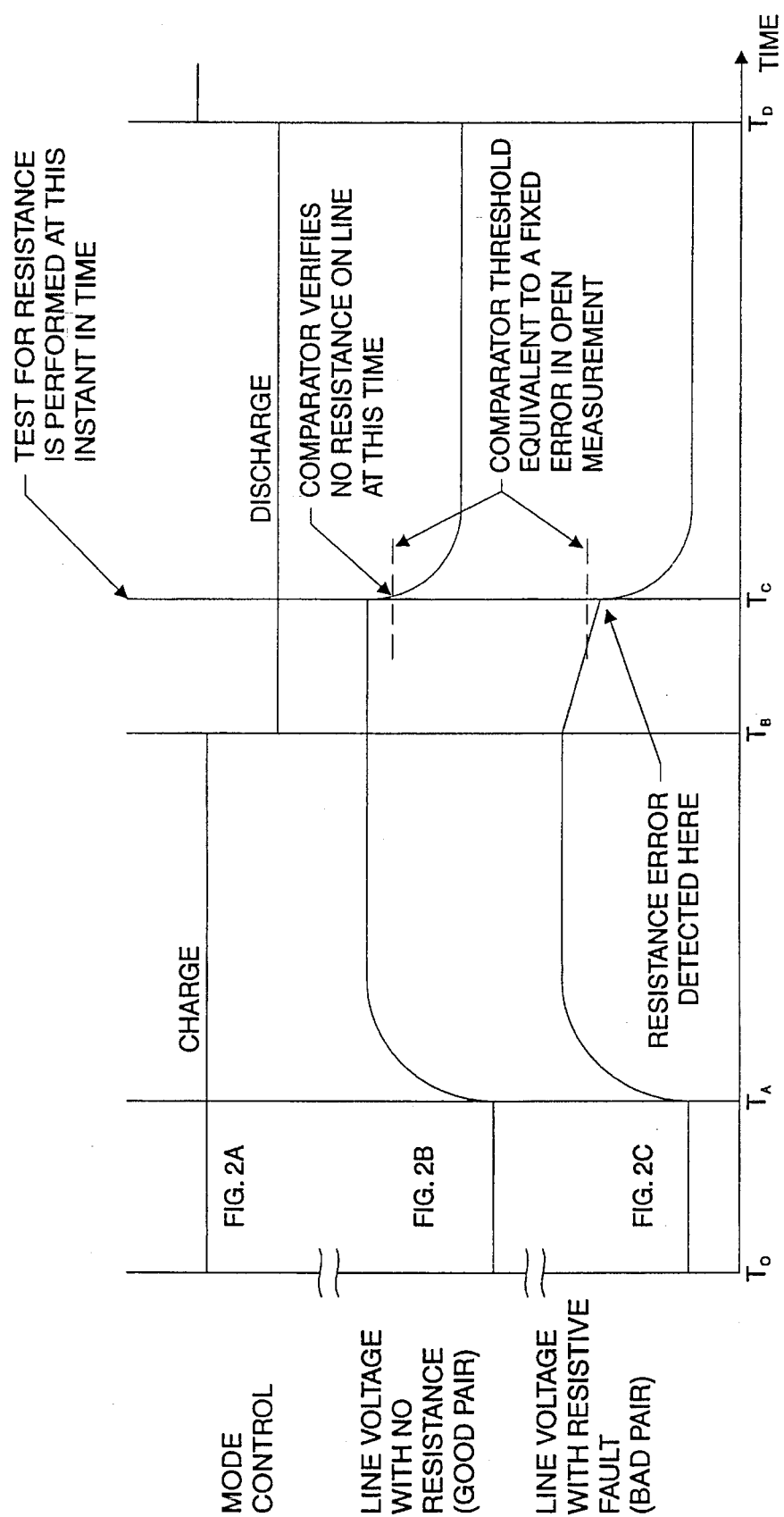

5,606,592

METHOD AND APPARATUS FOR ANALYZING RESISTIVE FAULTS ON TELEPHONES CABLES

This is a continuation of co-pending application Ser. No. 08/078,593 filed Jun. 16, 1993.

FIELD OF THE INVENTION

The present invention relates to methods and apparatuses for analyzing faults on telephone conductors.

BACKGROUND OF THE INVENTION

Telephone systems commonly employ copper wires as conductors for telephone circuits. Copper wires are subject to faulting, resulting in a degradation or loss of telephone signals and thus of telephone service.

Two of the most common faults are resistive faults and open faults. A pair of conductors with a resistive fault will typically have a continuity of either high or low impedance between the two conductors or between one of the conductors and ground. A pair of conductors that is free of faults does not exhibit continuity between the conductors or between one conductor and ground. A resistive fault is often caused by water entering the cable containing the conductors or by physical damage such as pinching or crushing the cable.

An open fault is present when a pair of conductors has lost continuity on either one or both sides of the pair. For example, an open fault can be caused by a cut cable, wherein the cut would break the continuity of one or both of the conductors in a pair. Another example of an open fault is where a cable splice failed to provide electrical conductivity between sections of a cable.

It is often the case that cables have a combination of faults. For example, a cable that has been cut may have an open fault but may also have conductivity to ground, and will therefore also have a resistive fault.

Due to the way in which faults are typically measured, cables that have combinations of both open and resistive faults present special problems for field technicians attempting to analyze and locate the faults. Open faults are normally analyzed by measuring the capacitance of one side of the pairs to ground, or by measuring the mutual capacitance of the pair. Knowing the relationship of capacitance per unit length, it is then possible to determine the distance to the open fault. Once the distance to the open fault is known, the field technician can take corrective action.

Capacitance may be measured by one of several techniques. A typical technique is to charge the line to a known voltage and/or discharge the line from a known voltage and measure the current required. The capacitance can then be determined from the charging or discharging current. However, if the line being measured has a resistive fault in addition to an open fault, a substantial error may be present due to the current or charge which will leak through the resistive path and not remain on the line for measurement purposes.

This problem is analogous to filling up a bucket with water to measure its volume. If the bucket has a hole in it, there will be an error in the measurement. This is because while the amount of water in the bucket is being measured, water is leaking out through the hole and is thus unaccounted for. In this analogy, the bucket is the cable to be measured, its volume is the capacitance of the line to be measured, and the hole is the resistive fault.

Prior art test sets typically check for resistive faults by placing a current source between two points (e.g. between the two conductors in a pair or between a pair conductor and ground) and measuring the resultant voltage. The resistance between the two points can be calculated using Ohm's law. If the measured resistance is high enough, then it will leak very little charge and have little effect on the capacitance measurement. On the other hand, if the resistance is low, the stored charge will quickly bleed off and the error on the capacitance measurement will be large.

The prior art approach suffers from several disadvantages. One disadvantage is that current sources normally have a limited operating range and accordingly have a limited measurement capability at high values of resistance. Another disadvantage is that the value of a resistive fault may depend on the amount of voltage that is applied across the fault. In fact, a resistive fault can even break down when subjected to a voltage.

Another disadvantage, and one which is important, is that simply measuring the resistance of a fault does not determine the amount of error in the capacitance measurement. This is because the amount of capacitance measurement error depends on several factors in addition to the value of the resistance. One such factor is the length of the line or conductor. If the line is long, it can store a large amount of charge, that is its capacitance is large. For a given resistance, the line will take a long time to drain the charge. However, if the line is very short, that is its capacitance is small, any resistive leakage will quickly drain all of the charge. Thus, capacitance and resistance are interrelated to each other. This interrelation may be expressed in terms of voltage: $V(t)=V_0 e^{-t/Rc}$, where $V(t)$ is the voltage across the circuit at time t, $V_0$ is the initial voltage, R is the resistance and C is the capacitance of the circuit.

Another such factor why simply measuring resistance will not accurately determine the error in a capacitance measurement is the amount of delay time between charging the line and then discharging the line for the capacitance measurement. Between the time that the charging cycle ends (for example, no more charge is being applied to the line) and the time that the capacitance measurement begins is a finite delay time. During this delay, some charge leaks through the resistive fault, producing error. Line length and the value of the fault resistance all affect the amount of error caused by the delay.

Thus, it is desirable to determine the error produced by a resistive fault in an open fault measurement, given all of the variables of impedance of the fault, line length and idle time between measurements.

SUMMARY OF THE INVENTION

It is an object of the present invention to provide a method and apparatus that analyzes resistive faults on telephone lines.

It is a further object of the present invention to provide a method and apparatus that determines the error produced by a resistive fault in an open fault measurement.

The method of the present invention analyzes resistive faults on a telephone conductor. The method charges the conductor to an initial charge, floats the conductor without a load for an amount of time and at the end of the amount of time, determines if any charge has leaked from the conductor, wherein the leakage of charge from the conductor indicates the presence of a resistive fault on the conductor.

In one aspect of the present invention, charge is measured in terms of voltage. The conductor is charged to an initial voltage and, after the conductor has been floated without a load for an amount of time, the voltage of the conductor is determined. The determined voltage is then compared to the initial voltage.

In another aspect of the present invention, the determined voltage is compared to a threshold voltage, and if the determined voltage is smaller than a threshold voltage, then an indication of error is provided.

In still another aspect of the present invention, the amount of error is determined from the initial and the determined voltages and is used to correct a capacitive measurement on the conductor.

The present invention has several advantages over the prior art. First, the determination of error due to a resistive fault is made independently of line length and of the value of the resistive fault. The relationship between open circuit capacitance and fault resistance is normalized for any combination of cable length or value of fault resistance. The amount of voltage drop between the initial voltage and the determined voltage is equal to the value of the open circuit capacitive error.

Another advantage of the present invention is that the line is charged to the voltage at which the open circuit capacitance measurement is to be made. Thus, any breakdown in the resistive fault will be taken into account.

Still another advantage is that the error measurement and the open circuit capacitance measurement are made independently of relay switching time because the same relay is used for both measurements. Thus, variations in switching times among relays is not a factor in making error determination.

BRIEF DESCRIPTION OF THE DRAWINGS

FIGS. 2A–2C are timing diagrams showing one complete cycle of the line resistance test of the present invention.

DESCRIPTION OF THE PREFERRED EMBODIMENT

Figure 1:
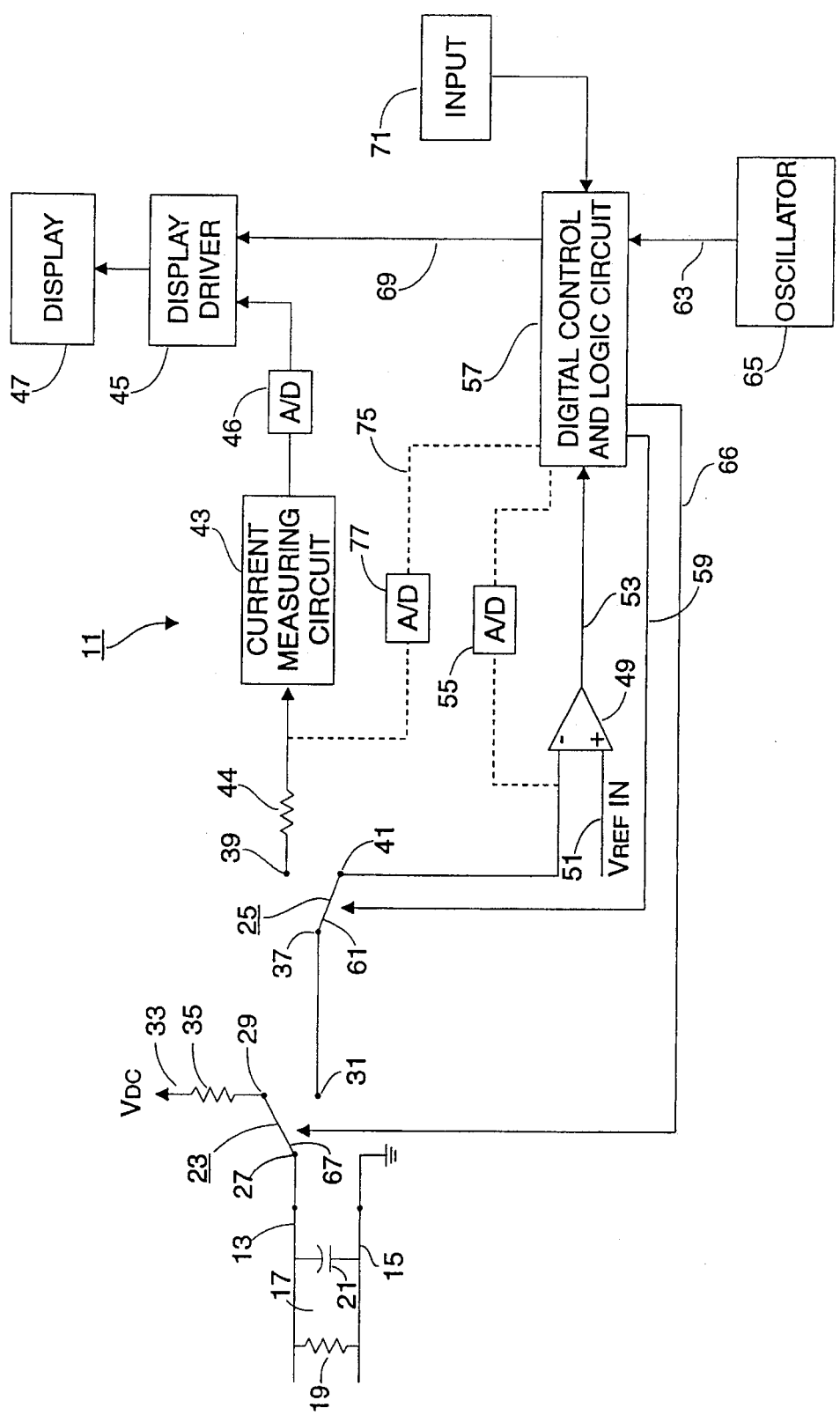
FIG. 1 is an electrical schematic diagram showing the apparatus of the present invention, in accordance with a preferred embodiment.

Referring to FIG. 1, the apparatus 11 of the present invention is shown, in schematic diagram. The apparatus is used to test one or more conductors 13, 15 in a telephone cable line 17. For example, the apparatus can be used to test tip and ring conductors together, or either of the tip or the ring conductors relative to ground. Normally, there is no continuity between the two conductors 13, 15. However, in FIG. 1 there is shown a resistive fault 19 between the two conductors. The two conductors also have a capacitance, represented in FIG. 1 by a discrete capacitor 21.

The apparatus 11 has a first relay 23 and a second relay 25. In the preferred embodiment, each relay is a mechanical armature relay, having a movable armature. Both relays are of the single pole double throw type. The armature contact 27 of the first relay 23 is connected to one of the line conductors 13. The other line conductor 15 is grounded. The first relay 23 has a charge contact 29 and a discharge contact 31. The charge contact 29 is connected to a supply voltage 33, through a current limiting resistor 35. In the preferred embodiment, the supply voltage 33 is 35.6 volts dc. The discharge contact 31 is connected to the armature contact 37 of the second relay 25.

The second relay 25 has a normal contact 39 and a test contact 41. The normal contact 39 is connected to a current measuring circuit 43 through a resistor 44. The output of the current measuring circuit 43 is connected to an A/D converter 46, which in turn is connected to an input of a display driver 45. The output of the display driver 45 is connected to a display 47. The test contact 41 is connected to an inverting input of a comparator 49. A reference voltage 51 is connected to the other input (the noninverting input) of the comparator 49. The output 53 of the comparator 49 is connected to an input of a digital control and logic circuit 57. The digital control and logic circuit 57 has an output 59 that controls the armature 61 of the second relay 25. The digital control and logic circuit 57 also has a strobe or clock input 63 that is connected to the output of an oscillator 65. The digital control and logic circuit 57 has an output 66 that controls the armature 67 of the first relay 23. The digital control and logic circuit 57 has an output 69 that is connected to the display driver 45. An input device 71, such as a keypad, is connected to the digital control and logic circuit 57. As an alternative to the digital control and logic circuit 57, a microprocessor or some other type of controller could be utilized.

The operation of the present invention will now be described. The apparatus 11 can perform two different measuring operations. The first measurement is of the open circuit capacitance 21, which is performed by the current measuring circuit 43. The second measurement is of the error in the open circuit capacitance measurement. The error is due to a resistive fault 19 on the line.

The apparatus 11 is connected to the line conductors 13, 15 such that one conductor 13 is connected to the armature contact 27 of the first relay 23 and the other conductor 15 is connected to the apparatus ground.

For each type of measuring operation, the digital control and logic circuit 57, by way of output 66, switches the first relay 23 between the charge mode and the discharge mode. In the charge mode, the armature 67 of the first relay 63 contacts the charge contact 29, wherein the conductor 13 is charged with the supply voltage 33. Referring to FIG. 2A, the first relay 23 remains in the charge mode for a sufficient length of time ($T_A$–$T_B$) to fully charge the conductor 13. This length of time is calculated as being several times longer than the amount of time needed to charge the longest conductor that would be encountered. After the conductor 13 becomes charged, the digital control and logic circuit 57 changes from the charge mode to the discharge mode, at times $T_B$–$T_C$, wherein the digital control and logic circuit 57 causes the first relay armature 67 to move from the charge contact 29 to the discharge contact 31. The discharge contact 31 is connected to either the current measuring circuit 43 or to the comparator 49, depending upon the position of the armature of the second relay 25.

To measure the capacitance of the conductors 13, 15, the second relay 25 is switched by the digital control and logic circuit 57 to the normal contact 39, wherein the current measuring circuit 43 is connected to the discharge contact 31 of the first relay 23. The conductor 13 is charged and then discharged by operating the first relay 23 as described above. After the armature of the first relay 23 makes contact with the discharge contact 31, then the conductor 13 discharges into the current measuring circuit 43. The current measuring circuit may be an analog measuring circuit, which is shown in Knippelmier, U.S. Pat. No. 4,032,841 and which is incorporated herein by reference. In FIG. 1 of Knippelmier, there is shown an integrating circuit formed by an operational amplifier and a capacitor. The integrating circuit serves to integrate the discharge current from the conductor 13 and produces an output voltage that is a linear function of the capacitance of the line. The output voltage is provided to the A/D converter 46 and the display driver 45, which then produces a signal for the display 47. In the preferred embodiment, the discharge current, instead of the charging current, is measured to determine the line capacitance. Alternatively, the charging current could be measured instead of the discharge current. However, as a matter of convenience, the discharge current is used because the length of the conductors 13, 15 and thus the amount of charging current required, is typically unknown.

As an alternative to the analog measuring circuit 43, the digital control and logic circuit 57 can be used to measure the current. The digital control and logic circuit 57 digitally integrates the discharge current and provides an output signal that corresponds to the output voltage. In this alternative embodiment, the normal contact 39 of the second relay is connected to an input 75 of the digital control and logic circuit 57 through the resistor 44 and through an A/D converter 77.

The open circuit capacitance measurement is accurate as long as there is either no resistive fault on the line or else there is only a negligible resistive fault. When the conductor 13 has a significant resistive fault 19, some charge will bleed off of the conductor, through the resistive fault 19 during the time $T_B$–$T_D$. This leakage of charge through the resistive fault 19 provides an error in the capacitance measurement.

The movement of the first relay armature 67 takes a finite amount of time, namely $T_B$–$T_C$, when the armature is moving from the charge contact 29 to the discharge contact 31, and $T_O$–$T_A$ when the armature is moving to the charge contact from the discharge contact. This delay time between the charge and discharge modes is used to determine if there is a resistive fault. This is because some charge, and therefore voltage, will bleed off of the conductor through the resistive fault 19 during the switching time $T_B$–$T_C$.

The present invention permits the identification and analysis of significant resistive faults on the line and the errors that are produced by these faults before the capacitance of the line is measured. This enables the operator to determine the accuracy of any capacitance measurement of the line and to take corrective steps in the case of an error.

The presence of a significant resistive fault on the line, and thus the presence of an error in the open circuit capacitance measurement, is indicated by first charging the conductor 13 to the actual working voltage of the open circuit measurement. Then, the conductor is allowed to float at that voltage without a load for a finite amount of time. At the end of the finite time period, the voltage in the line is tested to determine if there is a change in the voltage. A drop in the voltage indicates that charge on the conductor has leaked through a resistive fault.

The line resistance test is initiated by the digital control and logic circuit 57 switching the second relay 25 to the test contact 41. This connects the first relay discharge contact 31 to the comparator 49. The conductor 13 is charged as described above. At time $T_B$, the first relay 23 is switched from the charge contact 29 to the discharge contact 31. This switching time occupies the interval $T_B$–$T_C$. During the switching time interval, the line 17 is allowed to float at the charged voltage. Because the first relay armature 67 is not in contact with anything during the switching time, the line is under no load. The voltage of the line 17 is measured at time $T_C$, when the armature of the first relay contacts the discharge contact. The line voltage is input to the comparator 49, where it is compared to the reference voltage 51.

If there is no resistive fault on the line, as shown in FIG. 2B, then during the time interval $T_B$–$T_C$, the voltage remains at the same level. If there is a negligible resistive fault on the line, the voltage will be reduced somewhat at time $T_C$, but may still be within the threshold voltage established by the reference voltage 51. The output of the comparator 49 is the same if the line voltage at time $T_C$ either remains constant or else drops insignificantly with respect to threshold voltage. The display 47 indicates that no resistive fault is on the line and the capacitive measurement can be made.

If there is a significant resistive fault on the line, then the voltage drops below the threshold voltage 51 from times $T_B$ to $T_C$ (see FIG. 2C) and the output of the comparator 49 changes. The digital control and logic circuit passes this information on to the display 47, wherein the operator is informed of the existence of a significant fault on the line. The operator can then use other fault finding techniques such as a resistance finder to analyze the fault.

In the preferred embodiment, the digital control and logic circuit 57 is programmed to perform plural line resistance tests before reporting the accumulative result to the display. The digital control and logic circuit performs 32 line resistance tests. If eight or more of these tests indicate no resistance is present, then the line capacitance measurement can be made without any indication of resistance. If less than eight of the tests indicate that no resistance is present, then the display alerts the operator that a resistive fault is present. Conducting multiple tests is helpful in the event that noise is present on the line.

Use of the comparator 49 allows a simple "go" or "no go" test with respect to proceeding with the line capacitance test. More information can be obtained by bypassing the comparator 49 and connecting the test contact 41 of the second relay 25 to an A/D converter 55, which in turn is connected to the digital control and logic circuit 57. This arrangement can determine the amount of error that is to be expected in subsequent line capacitance measurements.

To measure the amount of error that may be due to a resistive fault, the voltage across the capacitor 21 is measured at time $T_C$ (for voltage $V_C$). Assuming that the effect of the fault discharge during the discharge cycle is negligible (that is, the resistive fault 19 is much greater than the discharge resistance 44), then the error in the subsequent capacitance measurement is as follows:

$$\text{Error}(\%) = \frac{V_C - V_S}{V_S} * 100\%.$$

This error is generated by two factors. First, if there is a resistive fault in the line, then the capacitor 21 is not charged to the source voltage due to leakage through the resistive fault. Instead, the capacitor 21 is charged to a lesser voltage. Charging current flows through the source resistor 35 and the resistive fault 19. The source resistance and fault resistance form a voltage divider. Thus, $$V_B = V_S \frac{r_f}{r_s + r_f}$$

where:

$V_B$=the voltage across conductors 13,15 at time $T_B$ $V_S$=the charging source voltage 33

$r_s$=the charge or source resistance 35

$r_f$=the fault resistance 19.

Second, any resistive fault will discharge the capacitor 21 between the times $T_B$ and $T_C$. This discharge is exponential and is as follows:

$$V_C = V_B e^{-t/r_f c_x}$$

where:

$V_C$=the voltage across the conductors 13,15 at time $T_C$ $c_x$=the unknown line capacitance 21.

t=time.

Note that if $r_f$ is very large, $V_C=V_B$, and $V_B=V_S$, and therefore $V_C=V_S$. If $V_S=V_C$, then the error equals 0%.

The error may be displayed to an operator. The error is typically given as a percentage, as shown by the error equation given above. For example, the error could be 5%. The operator can use the error measurement to determine the confidence or accuracy of any open circuit capacitance measurement made on the line 13,15.

Alternatively, the error could be used by the digital control and logic circuit 57 to adjust the open circuit capacitance ($c_m$) measurement:

$$c_x = c_m * \frac{100\%}{100\% + \text{Error}(\%)}.$$

This corrected value ($c_x$) is then displayed to the operator.

The effects of charge lost during the discharge cycle due to the fault resistance 19 may be accounted for with further mathematics, but is normally insignificant if the discharge resistance 44 is much less than the fault resistance 19. As discussed below, the present invention of analyzing resistive faults can be used with other applications besides open circuit capacitance, wherein there is no discharge cycle and thus no concern of losing charge during such a discharge cycle.

Although the present invention of analyzing a resistive fault on a line has been discussed with respect to determining the effects of the resistive faults on a capacitance measurement, there are other applications as well. For example, the present invention can be used to determine the existence of a high resistance fault. Such high resistance faults typically are undetectable unless a high voltage is applied to the line. In fact, in the prior art, one method of determining if a high resistance fault exists is to apply a high voltage to the line, to force any high resistance fault there is to break down. The problem with this type of test is that line damage is incurred. Another prior art method involves applying pulses of high energy to the line. With the present invention, the line is charged to a higher voltage than 35.6 volts. The line is charged through the limiting resistor to avoid damaging the line in the event of a breakdown of any high resistance faults. Once the line is charged, then it is allowed to float for a finite amount of time, after which the voltage is measured. The measured voltage is compared to the initial voltage to determine if any charge has leaked off of the line through a resistive fault. The entire test consists of a single application of charge, thereby reducing the chance of cable damage. In this manner, the presence of a high resistance fault on the line can be determined. Once a high resistance fault has been identified as being on the line, corrective action can be taken.

Although the present invention has been described as using mechanical armature relays, other types of switching devices could be used. For example, in place of each relay, two solid state switches could be used. In place of the first relay 23, one switch (the supply voltage switch) would connect the supply voltage to the line 17, while the other switch (the measuring switch) would connect the line to either the current measuring circuit or to the digital control and logic circuit. The digital control and logic circuit would coordinate the switches so that after charging the line, the supply voltage switch would open, and then after a predetermined amount of time, the measuring switch would close.

Also, the same switch need not be used for both the open circuit capacitance measurement and the resistive fault measurement. The preferred embodiment uses a single switch to normalize any variation in switching times. However, two switches could be used, one for the open circuit capacitance measurement and the other for the resistive fault measurement, if the switching times of the switches were known so that these times could be accounted for.

Although the present invention as described utilizes voltages to determine if a resistive fault is present on a line, other types of measurements could be used. The present invention charges a line to an initial charge, allows the line to float for an amount of time without further charge being applied and without a load for the charge to escape to, and then determines if any charge has leaked off of the line. The determination of charge leakage can be made by voltage, current, etc.

The foregoing disclosure and showings made in the drawings are merely illustrative of the principals of this invention and are not to be interpreted in a limiting sense.

We claim:

1. A method of analyzing a resistive fault on a telephone conductor, comprising the steps of:
   a) charging said telephone conductor to an initial charge, said step of charging said telephone conductor to an initial charge further comprises the step of charging said telephone conductor to an initial voltage;
   b) after charging said telephone conductor to said initial charge, discontinuing the charging of said telephone conductor and floating said telephone conductor without a load for an amount of time; and
   c) at the end of said amount of time, determining if any charge has leaked from said telephone conductor, wherein the leakage of charge from said telephone conductor indicates the presence of a resistive fault on said telephone conductor;
   d) said step of determining if any charge has leaked from said telephone conductor further comprises the steps of determining the charge on said telephone conductor at the end of said amount of time and comparing said determined charge to said initial charge;
   e) said step of determining the charge on said telephone conductor further comprises the step of determining the voltage on said telephone conductor; and
   f) said step of comparing said determined charge to said initial charge further comprises the step of comparing said determined voltage to said initial voltage.

2. The method of claim 1 further comprising the steps of:
   a) comparing said determined voltage to a threshold voltage; and
   b) if said determined voltage is smaller than said threshold voltage, then providing an indication of error.

3. The method of claim 1 further comprising the step of determining the amount of error from said initial and said determined charges.

4. The method of claim 3 further comprising the steps of:
   a) measuring a capacitance of said telephone conductor by measuring the current needed to either charge said telephone conductor to said initial voltage or discharge said telephone conductor from said initial voltage; and b) correcting said capacitance measurement using said determined amount of error.

5. A method of analyzing a resistive fault on a telephone conductor, comprising the steps of:
  a) charging said telephone conductor to an initial charge;
  b) after charging said telephone conductor to said initial charge, discontinuing the charging of said telephone conductor and floating said telephone conductor without a load for an amount of
  c) at the end of said amount of time, determining if any charge has leaked from said telephone conductor, wherein the leakage of charge from said telephone conductor indicates the presence of a resistive fault on said telephone conductor;
  d) said step of determining if any charge has leaked from said telephone conductor further comprises the steps of:
    i) determining the amount of charge that has leaked from said telephone conductor;
    ii) comparing said amount of charge that has leaked from said telephone conductor to a threshold amount; and
    iii) if said amount of charge that has leaked from said telephone conductor is larger than said threshold amount, then providing an indication of error.

6. A method of measuring capacitance of a telephone conductor, comprising the steps of:
  a) charging said telephone conductor to an initial charge;
  b) floating said charged telephone conductor for an amount of time, said telephone conductor being unconnected to a load or a charging source while said telephone conductor is floating;
  c) alter said amount of time has passed, determining if any charge has leaked from said telephone conductor, wherein if any charge has leaked from said telephone conductor, then said telephone conductor has a resistive fault;
  d) changing the charge on said telephone conductor;
  e) integrating the change in charge on said telephone conductor so as determine said capacitance of said telephone conductor;
  f) if in step c), charge had leaked from said telephone conductor, then correcting said determined capacitance to compensate for said resistive fault.

* * * * *